Jan. 4, 1944. W. M. PARKE 2,338,199
DEFLECTOR
Filed June 21, 1941
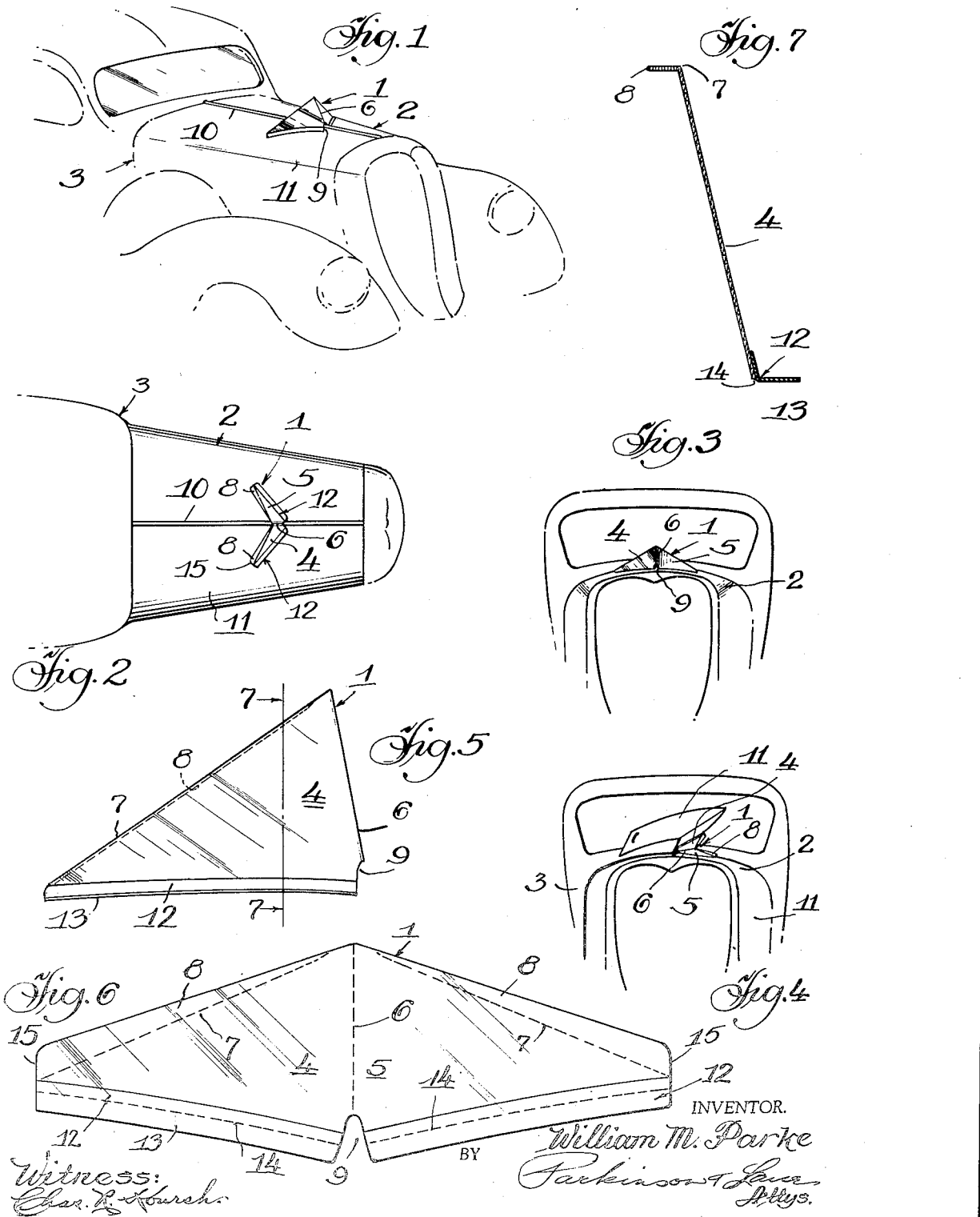
INVENTOR.
William M. Parke
BY Parkinson & Lane
Attys.
Witness:
Chas. R. Kursh Patented Jan. 4, 1944

2,338,199

UNITED STATES PATENT OFFICE 2,338,199

DEFLECTOR

William M. Parke, Brook, Ind.

Application June 21, 1941, Serial No. 399,127

4 Claims. (Cl. 296—91)

The present invention relates to a deflector and more particularly to a device for attachment to the front or hood of an automobile or other power propelled vehicle for deflecting bugs or insects, dust or other foreign particles, snow, etc., and preventing their striking and obstructing the vision through the windshield of an automobile. By the present novel construction of deflector, the device may be readily applied and secured to the hood at a position and angle with respect to the windshield as to eliminate the objectionable spattering of insects and the resulting obscured vision so commonly encountered in driving an automobile or other vehicle.

Another object of the present invention is the provision of a deflector made of a transparent material so as not to obstruct the vision of the driver or occupants of the automobile or other vehicle, and which material has sufficient inherent strength as to withstand the high speeds at which automobiles travel.

A further object of the present invention is the provision of a novel means and method of attaching the deflector to the hood of the automobile or other vehicle. This may be quickly and conveniently accomplished and permits ready removal and replacement should the occasion arise. By making it readily removable as well as adjustable, the deflector may be applied to any make or model of automobile or other vehicle and may be so positioned as to deflect the air to the outside of the confines of the windshield when the automobile or other vehicle is in forward motion. It is so constructed and arranged that the angular position and slope of its sides may be varied in accordance with the length and contour of the hood and windshield. The present invention is readily adapted for use on aircraft, motor boats or other power propelled vehicles. In aircraft it would be particularly adapted for deflecting snow.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a fragmentary perspective view of the front end of an automobile with the novel deflector applied to the hood.

Figure 2 is a plan view of the deflector applied to the hood.

Figure 3 is a front view of the deflector mounted on the hood.

Figure 4 is a view similar to Figure 3 but with the hood raised and showing the position assumed by the deflector.

Figure 5 is a view in side elevation of the novel deflector.

Figure 6 is a view in front elevation of the deflector blank.

Figure 7 is a view in vertical cross section taken on the line 7—7 of Figure 5.

Referring more particularly to the disclosure in the drawing, in the illustrative embodiment the novel deflector 1 is shown as suitably affixed to the hood 2 of an automobile 3. The deflector is preferably formed of a transparent plastic material of a thickness such as to withstand any wind velocity normally encountered in the operation of an automobile. To add further rigidity to the structure the adjoining sides 4 and 5 of the deflector which are bent rearwardly along the fold or line 6, have their upper edge bent or deformed inwardly along the broken line or fold 7 to form a relatively narrow and tapering portion 8. A cut-out 9 is so arranged as to straddle the hinge 10 provided on hoods of automobiles of the side lifting type. As shown in Figure 4, the deflector remains secured to the hood when a side 11 of this hood is lifted. At such times it will fold back out of the way along the fold or joint 6.

In order to secure the deflector against accidental or unintentional removal, adhesive tape 12 is suitably applied to the lower edge of the opposite sides 4 and 5 with the free or projecting portion 13 adapted to be affixed to the hood 2. The lower edge 14 of each side is preferably contoured or curved complementary to that of the upper surface of the hood and the upper bent portion 8 has its lowermost edge 15 so formed as to seat against the hood when the deflector is in assembled position, thus adding strength and rigidity to the device and preventing its collapse under wind pressure.

From the above description and the disclosure in the drawing, it will be readily apparent that the deflector may be quickly attached to any hood. The adhesive attaching means does not mar the finish of the hood regardless of the number of times that the device is attached and detached. Although the deflector is assembled in substantially the same angular relationship on each hood and make of automobile or other vehicle, its position or location on the hood intermediate the radiator and windshield may be varied. Thus on automobiles having a relatively long hood, it might be necessary to position the deflector nearer the windshield than on automobiles having a shorter hood. However, since the detachment and re-assembly may be quickly accomplished and without damage to the deflector or hood, the operator can readily adjust its position so that the air will be deflected outside the area of the windshield when the automobile is in forward motion.

The novel deflector is shown as constructed of a transparent material of a thickness, strength and rigidity sufficient to withstand high speeds. Such material may be of a cellulosic composition or a plastic suitable for the purpose.

Having thus disclosed the invention, I claim:

1. A device for deflecting bugs or other insects, dust or other foreign particles, snow, etc., from the windshield of an automobile while it is in forward motion, comprising a deflector having angularly arranged, rearwardly sloping sides having their lower edges conforming to the surface contour of the hood of the automobile, and means for securing the lower edge of each side to the surface of the hood forwardly of the windshield, the sides being so constructed and joined that either side of the hood may be raised for access to the motor without removal of the deflector.

2. A device for deflecting bugs or other insects, dust or other foreign particles, snow, etc., from the windshield of an automobile while it is in forward motion, comprising a deflector having angularly arranged and substantially triangular-shaped, rearwardly sloping sides and means securely anchoring the edge of the base of the sides to the upper surface of the hood between the radiator and windshield of the automobile.

3. A device for deflecting bugs or other insects, dust or other foreign particles, snow, etc., from the windshield of an automobile while it is in forward motion, comprising a deflector having angularly arranged, rearwardly sloping sides having their upper edges folded to enhance their rigidity and their lower edges conforming to the surface contour of the hood of the automobile, and means for securing the lower edge of each side to the surface of the hood forwardly of the windshield.

4. A device for deflecting bugs or other insects, dust or other foreign particles, snow, etc., from the windshield of an automobile while it is in forward motion, comprising a deflector having angularly arranged, rearwardly sloping sides of transparent material joined together to permit their angular adjustment, means for securing the lower edge of each side to the surface of the hood forwardly of the windshield, said joined connection permitting opening of the hood without removal of the deflector.

WILLIAM M. PARKE.